April 24, 1945.  H. HOOVER, JR  2,374,204
APPARATUS FOR RECORDING SEISMIC WAVES
Filed July 24, 1939    2 Sheets-Sheet 1

INVENTOR.
HERBERT HOOVER JR.
BY
Lippincott & Metcalf
ATTORNEYS.

UNITED STATES PATENT OFFICE 2,374,204

APPARATUS FOR RECORDING SEISMIC WAVES

Herbert Hoover, Jr., Sierra Madre, Calif., assignor, by mesne assignments, to United Geophysical Company, Pasadena, Calif., a corporation of California Application July 24, 1939, Serial No. 286,172

7 Claims. (Cl. 177—352)

The present invention pertains to a means and method of seismic exploration, and particularly to a system of reproducing seismic waves in which variable gain amplifiers are used to reproduce the seismic waves received. By means of my invention the first seismic waves to arrive at a receptor may be recorded while the amplifier gain is below maximum, and after the first arrivals are recorded the amplifier gain is controlled by the amplifier output in accordance with the predetermined action of an automatic amplitude control circuit. Recording the initial portion of a seismic wave train at intermediate sensitivity has many advantages, among which are the production of quiet traces prior to the reception of the seismic waves, and the production of sharp first breaks in the record.

The objects of the present invention are: to provide a method and means for varying the gain of a seismic wave amplifier partly as a predetermined function of time and partly by automatic amplitude control action; to provide a method and means for maintaining the gain of a seismic wave amplifier at a value below maximum during the recording of the first wave arrivals and thereafter varying the gain in accordance with the amplitude of the incoming signals; to provide a means and method for changing the bias of a gain control element of a seismic wave amplifier at a predetermined time interval following the excitation of a seismic wave source, and thereafter varying the gain in accordance with the amplitude of the incoming waves; to provide a means and method for changing the bias of gain control element of a seismic wave amplifier at a predetermined time interval following the recording of the first arrivals; to provide a method and means for controlling the gain of a seismic wave amplifier automatically over the wide amplitude range encountered in a train of seismic waves.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawings:

Fig. 1 is a schematic diagram of a preferred form of my invention applied to an apparatus set-up using a plurality of seismic wave reproducing channels.

Fig. 2 graphically illustrates an early portion of a typical seismic wave train.

Figure 1:
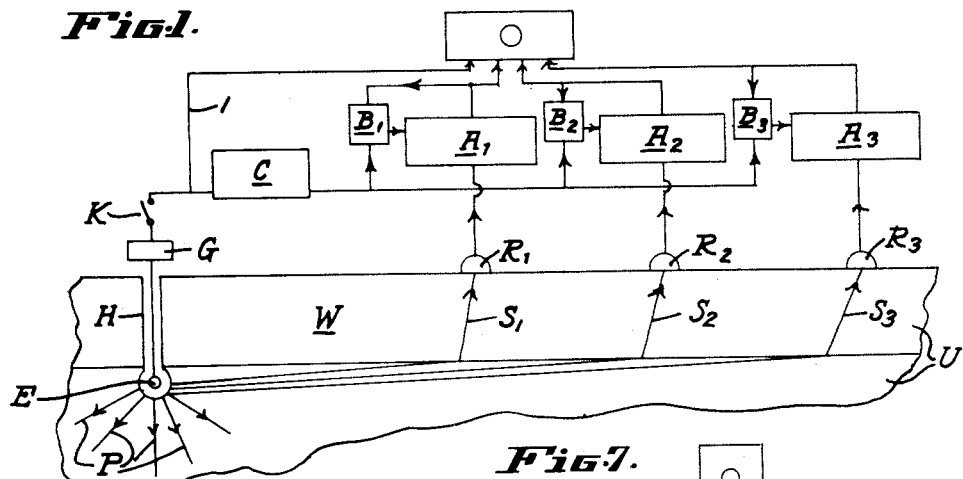

Referring to Fig. 1, U represents a vertical section of the earth near its surface and W represents the weathered layer.

In the usual practice of seismic geophysics, elastic waves are initiated at a source E, usually by the detonation of an explosive at the bottom of shot hole H. Waves originating at E and radiating in all directions as indicated by the lines $p$, encounter discontinuities in the earth, where they are deflected from straight paths as by refraction or reflection. Some of the deflected waves return to receptors $R_1$, $R_2$, and $R_3$ placed on or beneath the surface of the earth at points spaced from shot hole H. Said receptors $R_1$, $R_2$, and $R_3$ convert received elastic waves into corresponding electrical waves which are amplified by amplifiers $A_1$, $A_2$, and $A_3$ and translated into visual form by a multi-element recording galvanometer O. A typical record comprises several oscillograph traces, each corresponding to the response of different receptors. Such records are well known in the art and need not be reproduced here. The initial portion of such a trace obtained with a constant gain amplifier is illustrated in Fig. 2.

Usually the first waves to arrive at the receptors represent waves which travel from the source E beneath the weathered layer, and are refracted upward to the respective receptors along the paths $S_1$, $S_2$, and $S_3$ of Fig. 1. Thereafter waves reflected from various substrata are recorded at times corresponding to the depths of the strata.

Figure 2:
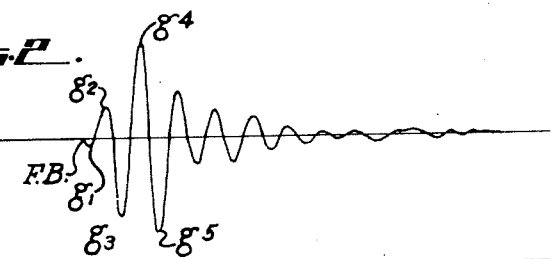

Referring to Fig. 2, the first half cycle $g_1$ of the refracted wave is of low amplitude while subsequently received portions $g_2$, $g_3$, $g_4$ and $g_5$ have greater amplitude. Following these, the waves received have smaller amplitudes. Usually the average amplitude of the waves diminishes rapidly with time following the first arrivals.

Figure 3:
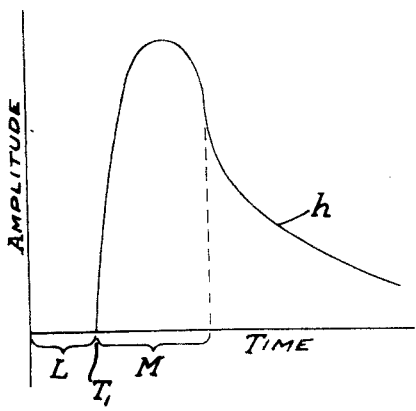
Fig. 3 is a graph representing a typical time variation of the envelope of a seismic wave train.

In Fig. 3 I have represented graphically a typical manner in which the amplitude envelope of a received wave train varies with time. During the time interval L no waves are received. At the instant T₁ the first arrival begins to give an indication of its presence and the amplitude of the received waves increases rapidly, reaching a maximum shortly after the first break, F. B. of Fig. 2. After the initial energy received in the short time interval M, the average amplitude of the received waves falls off rapidly along some such curve as that illustrated by h in the figure. The total range of seismic wave amplitudes often exceeds 120 db. while the amplitude range of the reflected waves may be only about 80 or 90 db.

It is to be understood that many deviations from the curve of Fig. 3 arise in practice, but that the general features are very common. My invention is applicable under the conditions illustrated, and many others as well.

For satisfactory recording of seismic waves I have found it desirable to vary the amplifier gain substantially inversely as the average amplitude of the incoming waves. In order to achieve sharp first breaks on the record traces, and also satisfactory recording of reflected waves, I apply a suitable gain control bias to the seismic wave amplifiers at the beginning of the recording to provide intermediate sensitivity during the recording of the first arrivals, and I thereafter vary the gain of the amplifier by a wide range automatic amplitude control circuit adapted to handle the 80 or 90 db. range of reflected waves.

The use of intermediate bias at the beginning of the recording has several advantages in addition to those hereinabove pointed out. Said control bias keeps the starting gain below maximum and thereby prevents the waves of large initial energy from overloading the amplifier and paralyzing the automatic amplitude control system. An intermediate gain at the beginning of the recording also makes possible recording the first break sharply and accordingly provides for accurate determination of the first break arrival times on the respective recording channels.

Referring again to Fig. 1 illustrating one form of my invention, amplifiers A₁, A₂, and A₃ utilize individual automatic amplitude control circuits B₁, B₂, and B₃ and a common auxiliary control circuit C which cooperates with automatic amplitude control circuits B₁, B₂, and B₃ to establish the initial bias on the amplifiers A₁, A₂, and A₃. Control circuit C utilizes as part thereof a time delay unit adapted to be actuated by energy derived from some suitable source such as the blaster G which initiates the detonation of explosive E when key K is closed. By means of control circuit C, I am able to produce a change in bias on the amplifiers A₁, A₂, and A₃ at any predetermined time interval following the initiation of the seismic waves.

An indication of the instant of detonation of explosive E is produced by means of an auxiliary galvanometer in the recorder O connected to the key K by cable 1.

Figure 4:
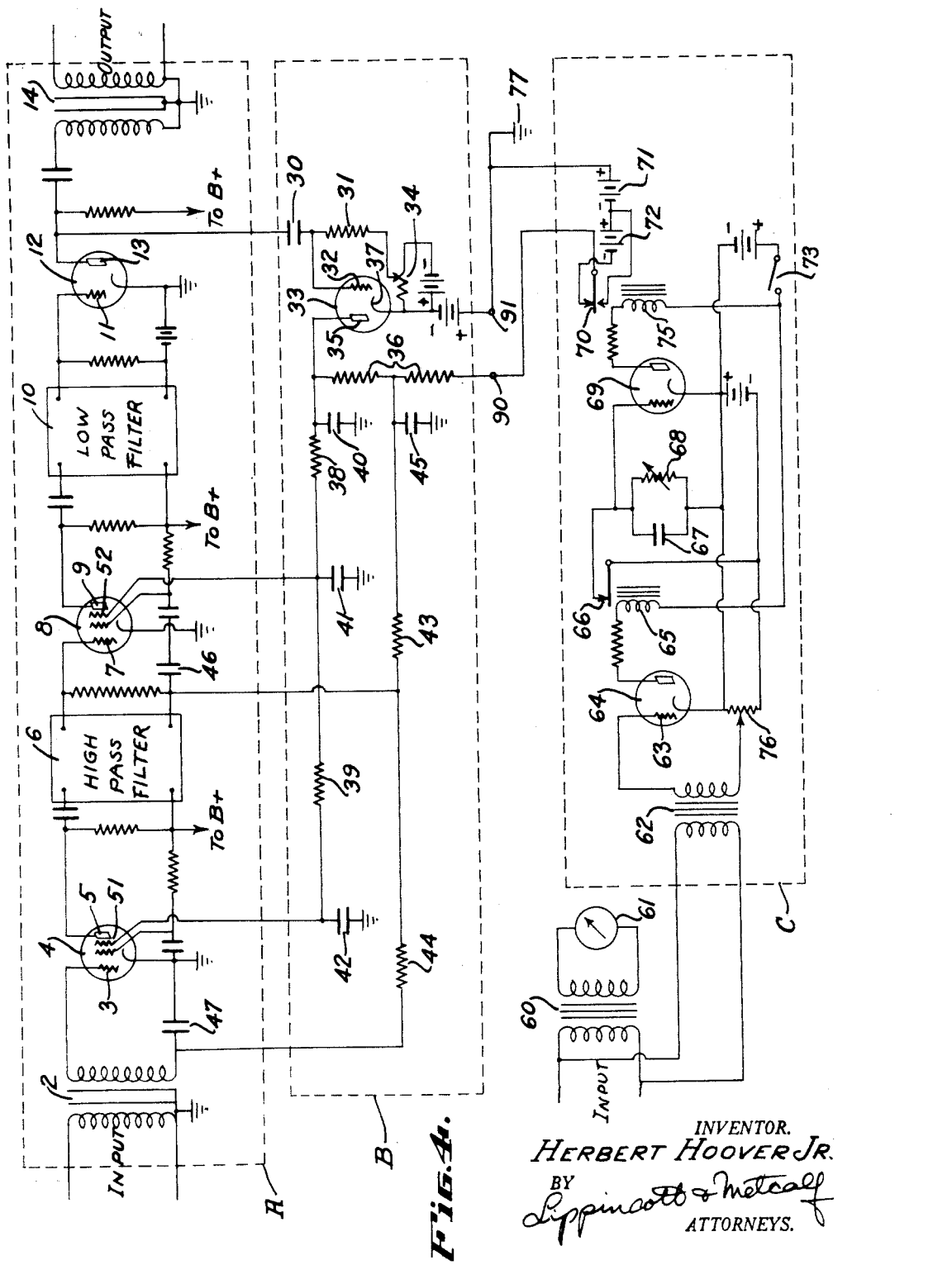
Fig. 4 is a wiring diagram of a preferred form of my invention.

Referring to Fig. 4, A represents a seismic wave amplifier, B an associated automatic amplitude control circuit, and C an auxiliary control circuit.

Electric waves generated by a receptor in response to seismic waves are transferred through a transformer 2 and impressed on signal grid 3 of amplifier tube 4. Signals appearing in the circuit of plate 5 passing through the high pass filter 6 are impressed on grid 7 of amplifier tube 8. Signals appearing in the circuit of plate 9 are in turn transmitted through low pass filter 10 to grid 11 of amplifier tube 12.

A portion of the signal appearing in the circuit of plate 13 is transmitted through transformer 14 to a recording galvanometer connected to the amplifier output. Another portion of the signal appearing in the circuit of plate 13 is applied to grid 32 of triode 33 within automatic amplitude control circuit B by means of coupling condenser 30 and resistor 31.

Said triode 33 is biased substantially to cut-off by potentiometer 34, and accordingly rectifies signals impressed on grid 32. Corresponding pulsating current flows through plate 35 and resistor 36 to cathode 37. Pulsating voltages appearing across resistor 36 are applied to suppressors 51 and 52 through the filtering network comprising resistors 38 and 39 and condensers 40, 41, and 42. A portion of the pulsating voltage appearing across resistor 36 is applied to signal grids 3 and 7 through the filtering network comprising resistors 43 and 44 and condensers 45, 46, and 47. The advantages I obtain from this type automatic amplitude control system are pointed out below.

At the instant of detonation a portion of energy derived from blasting circuit G is applied to transformer 60 to produce an indication of the time break on recording galvanometer 61.

Another portion of the blasting circuit energy is applied through transformer 62 to grid 63 of thyratron 64. When thyratron 64 is fired, current through relay coil 65 causes contacts 66 to open. An electric charge previously established on condenser 67 discharges through resistor 68 at a rate determined by the time constant of the circuit containing condenser 67 and resistor 68. When the voltage across resistor 68 falls to a predetermined value, thyratron 69 is fired and relay 70 opened in the upper position as shown and closed in the lower position.

Upper and lower positions of relay 70 correspond respectively to large and small voltages from batteries 71 and 72 which are applied as biases to signal grids 3 and 7 and suppressors 51 and 52 through resistors 36, 38, 39, 43, and 44.

Now consider a typical sequence of operations which may occur during the recording of a train of seismic waves. First, to prepare the apparatus to receive a wave train, key 73 is opened to break the current through relay coils 65 and 75 thereby causing the relay contacts to be closed, as shown. Assurance is obtained that potentiometer 76 is adjusted to such a point that thyratron 64 will not be fired by random disturbances such as those that may be transferred to grid 63 through transformer 62. With the control circuit C in the ready condition as shown, batteries 71 and 72 furnish initial gain control voltage on grids 3, 7, 51, and 52 and there is substantially zero current flowing through resistor 36.

When charge E is detonated by closing key K, the instant of detonation is recorded by galvanometer 61 and thyratron 64 is fired. Electrical waves reaching the input of amplifier A from a receptor on or beneath the surface of the earth pass through amplifier A. I prefer to select the values of bias batteries 71 and 72 in such a manner that the first wave $g_1$ to arrive is recorded with a relatively high amplitude so that the first break F. B. occurring at time T₁ is very sharp. For this purpose I select a total voltage for batteries 71 and 72 which produces intermediate gain of the amplifier during the recording of the first arrivals. Such an intermediate sensitivity is indicated by the height of the straight portion 80 of the gain curve in Fig. 5.

Immediately upon arrival of the wave train, gain control voltages begin to appear across resistor 36 in accordance with the amplitude of signals appearing in the output of amplifier A and the amplifier gain is decreased accordingly along the portion 81 of the curve, as shown.

At a predetermined time following the opening of contacts 66, contacts 70 are opened in the upper position and closed in the lower position. Battery 72 is accordingly removed from the circuit and only battery 71 applied to the grids 3, 7, 51, and 52. This switching may be performed before or after the first break has occurred, but preferably after. Charges previously existing on condensers 40, 41, 42, 45, 46, and 47 begin to leak off to ground 77 through the various associated resistors. During the recording of the seismic waves, therefore, following the first arrivals, the gain of amplifier A is determined by the combined effect of the bias provided by condensers 40, 41, 42, 45, 46, and 47 discharging to ground and the bias provided by the pulsating current from plate 35.

Figure 5:
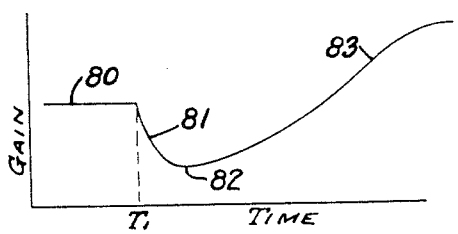
Fig. 5 is a characteristic time-gain curve obtained in accordance with my method.

Shortly after the first arrivals are recorded, the gain reaches a minimum indicated by point 82 in Fig. 5 and if the amplitude of the incoming waves decreases monotonically as indicated by curve $h$ of Fig. 3, the gain increases along some such curve as 83 finally reaching a maximum value determined by the potential of battery 71.

In an alternative form of my invention the variable voltage from control unit C may be applied as variable bias to vacuum tube 33 instead of being applied in series with the output of tube 33 appearing across resistor 36 as in the form shown.

In order to provide stable automatic amplitude control action over a wide amplitude range corresponding to the 80 or 90 db. range normally encountered in reflected seismic waves, I apply automatic amplitude control voltages from resistor 36 to suppressors 51 and 52 having sharp cut-off characteristics and a portion of the same automatic amplitude control voltage to signal grids 3 and 7 having remote cut-off characteristics in accordance with the principles of my copending application, Serial No. 286,648, filed July 26, 1939, entitled Seismic wave amplifier. now Patent No. 2,303,357 dated December 1, 1942.

Thus, it is seen that my invention provides a ready method for maintaining the amplifier gain at an intermediate value initially and for automatically varying the gain over a range wide enough to compensate for the amplitude variations normally encountered in the reception of seismic waves. If a wider range of gain control is required under special circumstances, a gain control voltage varied as any predetermined function of time whatever may be established between points 90 and 91 in accordance with the principles of my copending application, Serial No. 286,171, filed July 24, 1939, entitled Seismic exploration system, and wide range control obtained by the joint action of the time gain control voltage and an automatic amplitude control voltage.

In the form of my invention exemplified by Fig. 1, each amplifier utilizes a separate automatic amplitude control circuit and a common auxiliary circuit. But it will be clear that other forms of my invention may be employed. Two alternative preferred embodiments are illustrated in Figs. 6 and 7.

Figures 6, 7:
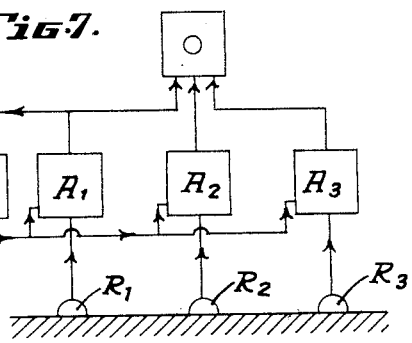
Figs. 6 and 7 are schematic diagrams of alternate forms of my invention applied to a set-up using a plurality of seismic wave reproducing channels.

In Fig. 6, receptors $R_1$, $R_2$, and $R_3$ are connected to corresponding amplifiers $A_1$, $A_2$, and $A_3$ and separate recording galvanometers $O_1$, $O_2$, and $O_3$. Separate control units and automatic amplitude control circuits $D_1$, $D_2$, and $D_3$ are associated with the respective amplifiers. In this case the operation of the separate control units is initiated by the first waves to arrive at the respective receptors. This form of my invention is especially suitable when the receptor stations are widely spaced and cables connecting the various stations to the shot point or to a central recorder would be of unwieldy length.

In Fig. 7, receptors $R_1$, $R_2$, and $R_3$, connected with corresponding amplifiers $A_1$, $A_2$, and $A_3$ produce waves which are recorded on a multistring galvanometer O. Unit F combines the functions of control unit C and automatic amplitude control circuit B of Fig. 4. The gains of all amplifiers $A_1$, $A_2$, and $A_3$ are controlled by the common unit F. The operation of control unit F may be initiated by the first waves to reach receptor $R_1$ and the automatic amplitude control voltages acting on all the amplifiers are derived from the output of a single amplifier, in this case amplifier $A_1$. This form of my invention is particularly useful in portable equipment in which light weight and compactness are essential features. A modification of this form of my invention would utilize a connection from control unit F to the seismic wave source E as in Fig. 1.

Broadly speaking, my invention comprises varying the gain of a seismic wave amplifier, partly as a function of the strength of the received signals and partly as a predetermined function of time independent of the signal strength. In particular, I prefer to maintain amplifier gain at an intermediate value during the recording of the first breaks. To do this I prefer to utilize a large gain control voltage at the beginning of the recording and switch to a lower voltage shortly after the recording has commenced. In practicing my invention I may perform this switching manually but I prefer to do it automatically by application of energy derived from the wave source at the instant waves are generated or by the application of energy obtained from the first arrivals.

I claim:

1. Apparatus for seismic prospecting comprising a plurality of spaced seismic wave receptors adapted to convert seismic waves into corresponding electrical waves, a plurality of amplifiers connected to the respective receptors, a corresponding plurality of recorders connected in the output circuits of the respective amplifiers, a corresponding plurality of automatic gain control means each responsive to amplified signals appearing in a corresponding amplifier and adapted to produce a gain control voltage in accordance with the amplitudes of said corresponding amplified signals, common auxiliary gain control means adapted to provide a control voltage which varies as a predetermined function of total time elapsed from a predetermined instant independently of the signal strength, a plurality of means for simultaneously applying gain control voltages from both said auxiliary gain control means and said automatic gain control means to corresponding amplifiers in such a manner as to vary the gain of said amplifiers partly as an inverse function of corresponding amplified signal amplitudes and partly in accordance with said predetermined function of time, whereby the total overall gain of each amplifier is varied substantially inversely as the amplitude of input waves throughout a more extensive amplitude range than could be handled by the automatic gain control means operating alone.

2. In apparatus for seismic prospecting utilizing an amplifier including a grid-type gain control element having an input and an output connected respectively to a seismic wave receptor adapted to convert seismic waves into corresponding electrical waves and a recorder, the improvement which comprises automatic gain control means responsive to a signal having its origin in said seismic waves and adapted to produce gain control voltages in accordance with the amplitude of said signal, auxiliary gain control means adapted to provide a gain control voltage which varies as a predetermined function of the total time elapsed from a predetermined instant independently of the signal strength, and means for simultaneously applying said gain control voltages from both said gain control means to said control element to vary the gain of said amplifier partly as an inverse function of said signal strength and partly in accordance with said predetermined function of time, whereby the total overall amplifier gain is varied substantially inversely as the amplitude of input waves throughout a more extensive amplitude range than could be handled by the automatic gain control means operating alone.

3. Apparatus for seismic prospecting comprising a plurality of spaced seismic wave receptors adapted to convert seismic waves into corresponding electrical waves, a plurality of amplifiers and recorders connected to said receptors, each amplifier including a corresponding gain control element, a corresponding plurality of automatic gain control means each responsive to signals appearing in the output of a corresponding amplifier and adapted to produce a gain control voltage in accordance with the amplitudes of said corresponding output signals, common auxiliary gain control means adapted to provide a control voltage which varies as a predetermined function of total time elapsed from a predetermined instant independently of the signal strength, a plurality of means for simultaneously applying gain control voltages from both said auxiliary gain control means and said automatic gain control means to corresponding gain control elements to vary the gain of said amplifiers partly as an inverse function of corresponding output signal amplitudes and partly in accordance with said predetermined function of time, whereby the total overall gain of each amplifier is varied substantially inversely as the amplitude of input waves throughout a more extensive amplitude range than could be handled by the automatic gain control means operating alone.

4. Apparatus for seismic prospecting comprising an amplifier having an input and output connected respectively to a seismic wave receptor adapted to convert seismic waves into corresponding electrical waves and a recorder, said amplifier including a grid-type gain control element, automatic gain control means responsive to a signal appearing in the output of said amplifier and adapted to produce gain control voltages in accordance with the amplitude of said output signal, auxiliary gain control means providing a gain control voltage which varies as a predetermined function of the total time elapsed from a predetermined instant independently of the signal strength, means for simultaneously applying said gain control voltages from both said gain control means to said gain control element to vary the gain of said amplifier partly as an inverse function of output signal strength and partly in accordance with said predetermined function of time, and means within said auxiliary gain control means for establishing an intermediate value of gain during the recording of the initial portion of a received seismic wave train, whereby the initial gain is favorable to recording a sharp first break without excessively overloading the system and the amplifier gain is varied substantially inversely as the amplitude of waves received after said initial portion is recorded.

5. In apparatus for seismic prospecting, a seismic wave receptor adapted to convert into electric waves a seismic wave train, an amplifier connected to the receptor and including a grid-type gain control element, and gain control means connected to said element to vary the gain of the amplifier as a function of two independent electrical parameters, the constants of the gain control means being coordinated to vary one of the parameters solely as a predetermined function of the time elapsing since the reception of the first portion of the wave train, and to independently and simultaneously vary the other parameter as a function of signal strength of said amplifier.

6. In apparatus for seismic prospecting, a seismic wave receptor adapted to convert a seismic wave train into electrical waves, an amplifier connected to the receptor and including a grid-type gain control element, a voltage source connected to said element and including means for producing a voltage which varies as a continuous predetermined function of the time elapsed since the reception of the first portion of the seismic wave train independently of the amplitude of the received waves, and another voltage source connected to said element and responsive to the electrical output of the amplifier and including means for converting said electrical output into a unidirectional voltage which varies as a function of the output amplitude, whereby the gain of the amplifier may be simultaneously varied as a function of the two voltages.

7. In apparatus for seismic prospecting, a seismic wave receptor adapted to convert a seismic wave train into electrical waves, an amplifier connected to the receptor and including a grid-type gain control element, a voltage source including means for producing a voltage which varies as a predetermined function of the time elapsed from a predetermined instant independently of the amplitude of the received waves, another voltage source responsive to received seismic wave energy and including means to convert such energy into a unidirectional voltage which varies as a function of the amplitude of the received waves, and means for simultaneously applying said voltages to said gain control element in such a manner as to vary the gain of the amplifier inversely as a function of the amplitude of the received waves.

HERBERT HOOVER, Jr.